H. WYMAN.
PHOTOGRAPHIC FILM PACKAGE.
APPLICATION FILED APR. 14, 1914.
1,132,993.
Patented Mar. 23, 1915.
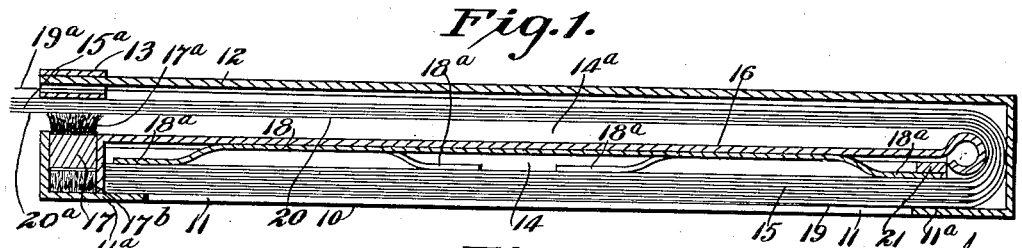
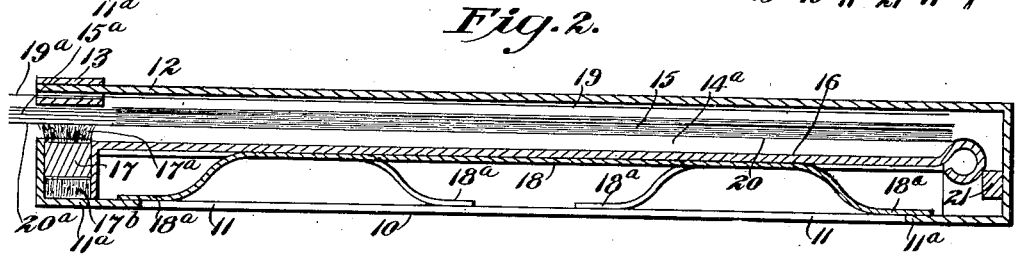
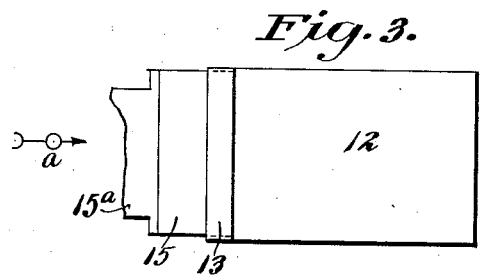
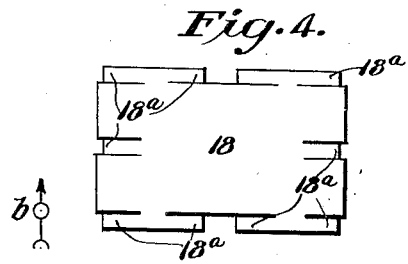
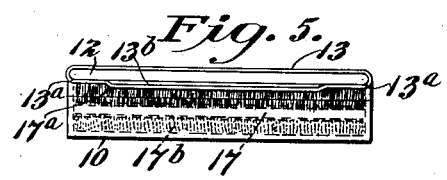
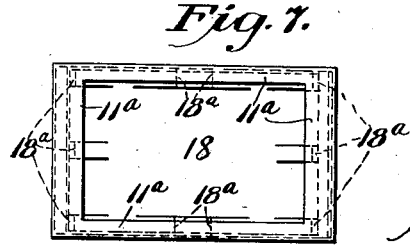
Witnesses:
Arthur O. Berry.
L. G. Llewellyn
Inventor:
Horace Wyman
By Ernest R. Llewellyn
Attorney

UNITED STATES PATENT OFFICE.

HORACE WYMAN, OF WORCESTER, MASSACHUSETTS.

PHOTOGRAPHIC-FILM PACKAGE.

1,132,993.   Specification of Letters Patent.   Patented Mar. 23, 1915.

Application filed April 14, 1914. Serial No. 831,759.

*To all whom it may concern:*

Be it known that I, HORACE WYMAN, a citizen of the United States, residing at Worcester, in the county of Worcester, and State of Massachusetts, have invented a new and useful Photographic-Film Package, of which the following is a specification.

This invention relates to photographic films of the flat type, the film package having an exposure chamber for a package of unexposed films and a safety cover for the films therein, a communicating chamber for the storage of the films after exposure and light excluding means for said compartments.

The object of my invention is to provide means to more securely retain the safety cover in the storage chamber when drawn therein; improved means to retain the edges of the unexposed films, in the exposure chamber, in close contact with the edges of the exposure opening and improved light excluding means for the storage chamber, all of which will be hereinafter fully described and more specifically pointed out in the appended claims.

In the accompanying drawing I have shown my improvement combined with a flat type of package sufficient to enable those skilled in the art to understand the construction and operation thereof.

Referring to the drawing: Figure 1, is a longitudinal section of the flat type package with my improvements contained therein: Fig. 2, is a view corresponding to Fig. 1, but shows some of the parts in different positions: Fig. 3, is a plan view of the flat type package with one of the exposed films partially withdrawn through the front opening of the storage chamber: Fig. 4, is a detail of the plate having the film follower springs formed thereof, at its edges: Fig. 5, is an end view of Fig. 3, viewing in direction of arrow *a*, same figure, showing the opening under the back for the reception of the safety cover tab, also the light excluding member with yielding material on its top and bottom sides, the manipulating tabs being omitted in this view: Fig. 6, is an edge view of Fig. 4, viewing in direction of arrow *b*, same figure: Fig. 7, is a front view of the package showing the exposure opening, my improved plate with its follower springs being shown in their operative position, their contacting ends immediately under the flanges of the exposure opening.

In the accompanying drawing the case 10 of the package may be formed of any suitable material as card or paste-board and is provided with an exposure chamber 14 having an opening 11 at its front side, for the exposure of the films contained therein, with flanges 11ª formed on the case, around the opening for the edges of the films to bear against.

The unexposed films 15, contained in the exposure chamber 14 are provided with backings and withdrawing tabs 15ª, said tabs being used to withdraw the films through the communicating opening and into the storage chamber 14ª, after said films 15 have been exposed.

The edges of the outer film are held in close contact with the flanges 11ª of the exposure opening by a series of outwardly extending flat springs 18ª bearing against the innermost film of the pack.

The package is also provided with a storage chamber 14ª, for the storage of the films after exposure, the partition 16, between said exposure and storage chamber, having a communicating opening at one end, and between the chambers. Said package has, at its front end, an opening out of the storage chamber 14ª, through which the manipulating tabs 15ª extend after passing through the storage chamber 14ª.

12 is the back cover of the package and is provided at its front end with a guide 13 continuing around the inner and outer sides of said back 12.

The guide 13 may be formed of paper or other flexible material, the outer edges 13ª being pressed or secured to the inner side of the back cover 12 thereby forming an opening 13ᵇ through which the safety sheet tab 19ª passes. The upward pressure of the light excluding member 17, below the tabs of the films, acts to retain said film tabs and the flexible guide 13 in light excluding contact with the back cover 12. The guide 13 extending around the outer side of the back cover 12 may be of such material as to act as a reinforcing bar for the end of said back cover 12. Said chamber 14ª is provided at its front end, with an opening the width of the chamber 14ª. This construction allows a film to be freely withdrawn, see Fig. 3. Said chamber is also provided at its front end, in a recess or pocket, with a movable light excluding member 17, said member 17 having secured to its upper and lower sides strips of pile fabric, 17ª and 17ᵇ, or other yielding material. The elasticity of the lower strip 17ᵇ, which rests upon the bottom of the pocket, acts to move the member 17 bodily upward, the upper strip 17ª acting against and holding the manipulating tabs 15ª in close contact with the inner side of the guide 13 and backing 12, thereby excluding the light from the film storage chamber 14ª.

18 is a plate lying loosely at the rear of the exposure chamber 14. Said plate 18 has formed thereof, around its edges, a series of flat springs 18ª which bear outwardly against the backing of the innermost film, of the series of films 15 in the exposure chamber 14, thereby securing the edges of the first or outer film in close contact with the flanges 11ª, immediately above it, which prevents the film from becoming displaced or buckling during the exposure.

The sensitized films 15 in the exposure chamber 14 are provided with an opaque safety sheet 19. Said sheet acts to protect the sensitized films 15 from the light before being placed in the camera. Said safety sheet is provided with a manipulating tab 19ª which passes through the storage chamber 14ª and is separated from the tabs of the film backing by having an independent exit between the inner side of the back 12 and the guide 13, said tab 19ª being used to draw the safety sheet 19 into the storage chamber 14ª after the package has been properly placed within the camera. The outer portion of the tab 19ª is then torn off adjacent to the guide bar 13, thereby securing the safety sheet against displacement and eliminating the possibility of light entering the storage chamber 14ª during the removal of any of the exposed films from said chamber 14ª. The sensitized films 15 are also provided with backings terminating in manipulating tabs 15ª which extend through the storage chamber 14ª and the opening at the front end of the package, said tabs 15ª being used to draw the films 15 into the storage chamber 14ª after exposure. The tabs are then torn off adjacent their exit.

In my improvement I also provide a sealing sheet 20 terminating in a manipulating tab 20ª. Said sealing sheet 20 is provided at its inner end with a transverse strip or bar 21 of a size to close the communicating opening, between the exposure chamber 14 and the storage chamber 14ª, when drawn therein. Said strip 21 remains normally in a recess formed on the top of the spring plate 18 near its edge and under the film follower springs 18ª at the rounded end of the partition 16, see Fig. 1, the sealing sheet passing around the rounded end of the partition 16 under the tabs of the films.

After the series of films 15 have been exposed and drawn within the storage chamber 14ª, the transverse strip or bar 21 is drawn, by means of the manipulating tab 20ª into the communicating opening of the exposure and storage chambers, 14 and 14ª, thereby eliminating the possibility of light entering at this point after the removal of the package from the camera.

Having thus described my invention, it will be evident that many changes and modifications may be made therein by one skilled in the art, without departing from the spirit and scope thereof, and I do not wish to be limited to the specific details herein disclosed.

I am also aware that heretofore film-backing tabs have been supported near their exit and I do not broadly claim such method, but

What I claim is:—

1. A photographic film package having an exposure chamber for unexposed films provided with an exposure opening in its face, and a storage chamber for exposed films communicating therewith at one end and provided with a tab exit passage at its opposite end, a series of films located in said storage chamber, each of said films being provided with a backing terminating in a manipulating tab, said tabs extending through said storage chamber and the exit passage therefrom, a safety sheet for closing the exposure opening of said storage chamber, said sheet being provided with a flexible manipulating tab extending through storage chamber and said tab exit passage; means located in said tab exit passage to separate said safety sheet tab from said film backing tabs and to hold said safety sheet when drawn into said storage chamber separated from said film backing tabs and in a flat position against the back of said storage chamber.

2. A photograhic film package having an exposure chamber for unexposed films provided with an exposure opening in its face, and a storage chamber for exposed films communicating therewith at one end and provided with a tab exit passage at its opposite end, a series of films located in said storage chamber, each of said films being provided with a backing terminating in a manipulating tab, said tabs extending through said storage chamber and the exit passage therefrom, a safety sheet for closing the exposure opening of said storage chamber, said sheet being provided with a flexible manipulating tab extending through said storage chamber and said tab exit passage; a plate lying loosely in the rear of the exposure chamber and having formed in its edges a series of outwardly extending flat film follower springs, said springs acting in direct contact with the inner film backing to hold the outer film in close contact with the flanges of the exposure opening.

3. A photographic film package having an exposure chamber for unexposed films provided with an exposure opening in its face, and a storage chamber for exposed films communicating therewith at one end and provided with a tab exit passage at its opposite end, a series of films located in said storage chamber, each of said films being provided with a backing terminating in a manipulating tab, said tabs extending through said storage chamber and the exit passage therefrom, a safety sheet for closing the exposure opening of said storage chamber, said sheet being provided with a flexible manipulating tab extending through said storage chamber and said tab exit passage; a movable transverse light excluding member, provided at its top and bottom sides with resilient material, said member acting against the under side of the manipulating tab, through the resiliency of the material on its sides, thereby retaining said tabs in close contact with each other under the inner side of the package back or guide, substantially as shown and described.

4. A photographic film package having an exposure chamber for unexposed films, provided with an exposure opening in its face, and a storage chamber for exposed films communicating therewith at one end and provided with a tab exit passage at its opposite end, a series of films located in said storage chamber, each of said films being provided with a backing terminating in a manipulating tab, said tabs extending through said storage chamber and the exit passage therefrom, a safety sheet for closing the exposure opening of said storage chamber, said sheet being provided with a flexible manipulating tab extending through said storage chamber and said tab exit passage: a light excluding strip or bar provided in the exposure chamber a having connected thereto a manipulating tab, normally in a recess above the spring plate and under the springs cut from the plate, said tab passing through the storage chamber and the tab exit from said storage chamber, said tab being used to draw the light excluding bar within the communicating opening between the exposure and storage chambers after the series of films have been drawn within the storage chamber after exposure, thereby excluding the light at this point when the package is removed from the camera, substantially as shown and described.

In testimony whereof I have hereunto set my hand, in the presence of two subscribing witnesses.

HORACE WYMAN.

Witnesses:
ERNEST R. LLEWELLYN,
JOHN B. SYME.